UNITED STATES PATENT OFFICE.

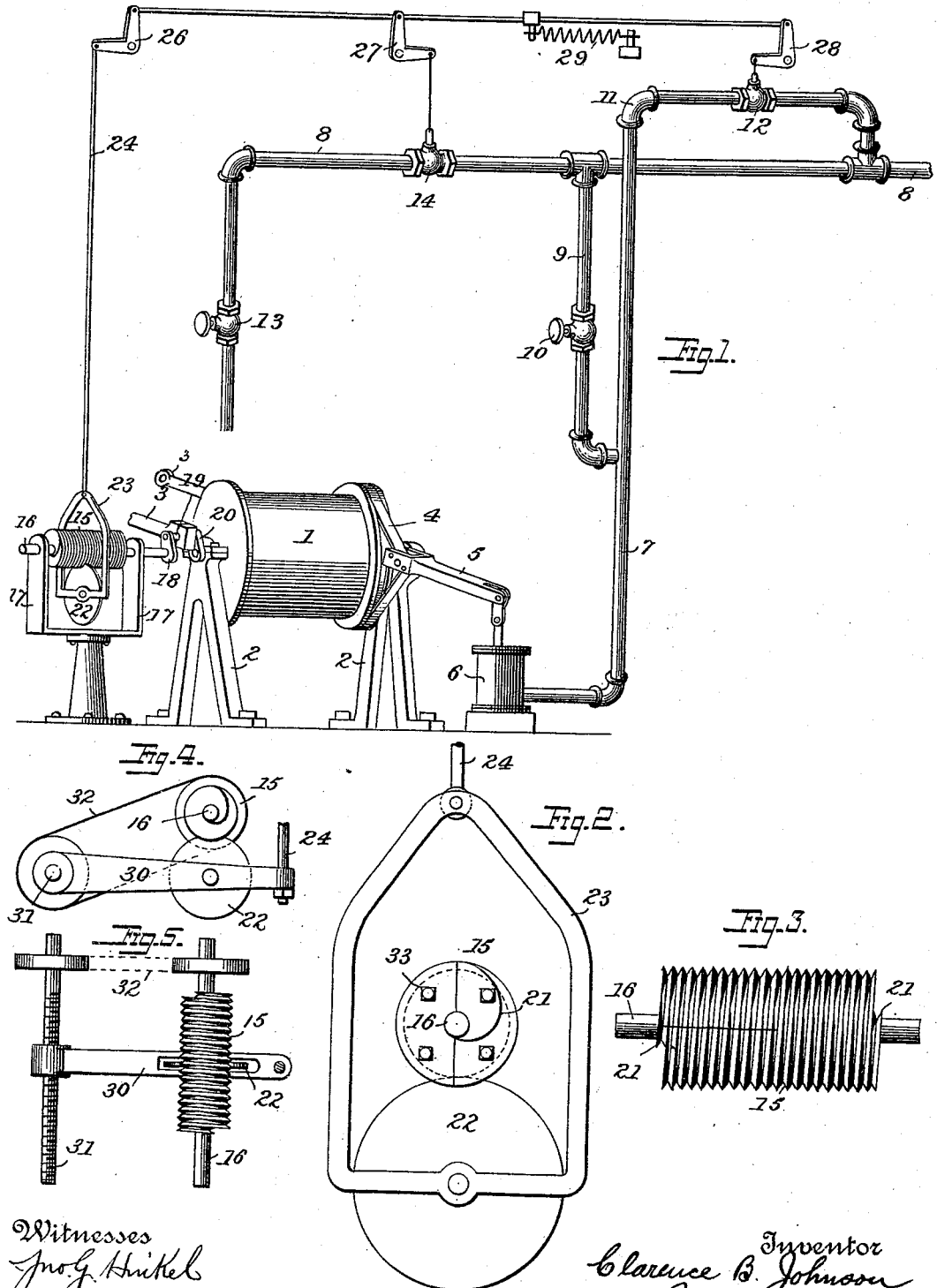

CLARENCE BRALEY JOHNSON, OF WILKES-BARRÉ, PENNSYLVANIA.

CONTROLLER FOR ELEVATORS.

SPECIFICATION forming part of Letters Patent No. 496,569, dated May 2, 1893.

Application filed January 21, 1893. Serial No. 459,187. (No model.)

*To all whom it may concern:*

Be it known that I, CLARENCE BRALEY JOHNSON, a citizen of the United States, residing at Wilkes-Barré, in the county of Luzerne and State of Pennsylvania, have invented certain new and useful Improvements in Controllers for Elevators, of which the following is a specification.

My invention relates to controllers or safety devices for hoisting or elevating apparatus.

The object of the invention is to provide mechanism for automatically stopping the elevator should the attendant neglect to do so when it has reached the highest or lowest station of its travel so as to prevent any damage to life or property.

In the accompanying drawings I have shown my safety device as applied to an elevator which is operated directly by a steam engine, the device being arranged to automatically shut off the steam from the engine and apply the brake to the hoisting drum should the engineer neglect to stop the engine at the proper point. It will be evident that some of the features of the invention are applicable to other forms of elevators or hoisting mechanisms, as for instance, those operated by electric or hydraulic power. I do not therefore wish to limit myself to the particular form of hoisting apparatus illustrated and described in this application.

In the accompanying drawings in which like reference signs refer to similar parts throughout the several views, Figure 1 is a perspective view of part of a steam hoisting machine having my improvements applied thereto. Fig. 2 is an end view of the threaded cylinder which operates the cut-off. Fig. 3 is a side view of the same, and Figs. 4 and 5 are side and plan views of a modified form of my invention.

In Fig. 1 is shown an ordinary hoisting drum 1 mounted in suitable bearings 2 and arranged to be driven by a double cylinder engine (not shown) through the medium of connecting rods 3—3. Upon one end of the drum is mounted a strap brake 4 operated by a lever 5 connected to the piston of a steam cylinder 6 in the usual manner. Steam to operate the brake is supplied to the cylinder 6 through a pipe 7 which may be placed in communication with the main steam pipe 8 through a branch 9 controlled by a hand valve 10 or through a branch 11 controlled by an automatic valve 12. In like manner the steam supply to the driving engine is controlled by a hand valve 13 or an automatic valve 14 in the pipe 8. A threaded cylinder 15 upon a shaft 16 is supported in suitable bearings 17 and connected with the hoisting drum 1 so that both will revolve simultaneously in either direction. As shown the shaft 16 is in line with the axis of the drum and a crank 18 on the shaft 16 is connected with the crank pin 19 of the engine crank 20. At each end of the cylinder 15 the thread runs spirally inward to the shaft 16, as best shown at 21 in Fig. 2. In the thread of the cylinder 15 there travels a disk or equivalent device 22 which I shall hereinafter term a "traveler." While the traveler is preferably a disk as shown it will be evident that a non-rotating piece or plate would answer the same purpose.

In Figs. 1 and 2 the traveler 22 is supported on a yoke 23 which is connected with the automatic valves 12 and 14 through the medium of rods 24 and 25 and elbow levers 26, 27 and 28. The traveler 22 runs normally in the thread of the cylinder 15 and holds the valve 14 open and the valve 12 closed. The threaded cylinder is of such length that the traveler will run off of it onto the shaft 16 immediately after the elevator carriage reaches the upper or lower station, if the engineer neglects to stop the engine at the proper point. When the traveler reaches either end of the thread on the cylinder 15 it is immediately drawn up to the shaft 16 by the tension of a spring 29, the effect of which is to close the valve 14, shutting off the steam from the engine, and to open the valve 12 which admits steam to the brake cylinder and applies the brake. In this manner the steam can be shut off and the brake applied during one-half or one-quarter revolution of the winding drum and any damage to the elevator cage or its contents prevented.

My invention may be embodied in various forms of mechanism. Thus for instance in Figs. 4 and 5 the traveler is mounted upon a lever arm 30. The free end of the lever is connected to the rod 24 and the other end has a threaded perforation which fits a threaded shaft 31. The shaft 31 has a thread corresponding with the thread of the cylinder 15 and it is connected to the shaft 16 by a chain belt 32. The shaft 31 therefore serves as a pivot for the lever 30 and at the same time it feeds the lever backward and forward so as to keep the traveler properly in the thread of the drum 15.

In order that the points where the elevator will be stopped automatically may be adjusted I prefer to make a part of the threaded cylinder 15 in removable sections as shown in Fig. 2, which sections are attached to the main body of the cylinder by screws or bolts 33 or in any other suitable manner. In this manner the elevator may be automatically stopped at any desired point.

Having described my invention, what I claim, and desire to secure by Letters Patent, is—

1. The combination with an elevator or hoisting apparatus, of a spirally grooved or threaded cylinder mounted upon a shaft which is arranged to revolve as the elevator moves, the thread or groove extending inward to the shaft at each end of the cylinder, a traveler running in the thread of the cylinder, and devices connected with the traveler for stopping the elevator when the traveler reaches the end of the threaded cylinder, substantially as described.

2. The combination with an elevator or hoisting apparatus, of a threaded cylinder mounted upon a shaft and arranged to revolve as the elevator moves, the thread or groove extending inward to the shaft at each end of said cylinder, a traveler consisting of a rotating disk arranged to run in the thread of the cylinder, and devices connected with the traveler for stopping the elevator when the traveler reaches either end of the threaded cylinder, substantially as described.

3. The combination with an elevator or hoisting apparatus, of a threaded cylinder arranged to revolve as the elevator moves, a traveler arranged to run in the thread of the cylinder, a steam brake for the elevator, valves for controlling the supply of steam to the brake and to the hoisting engine, and connections between the traveler and said valves, whereby when the traveler reaches the end of the threaded cylinder the steam is shut off from the engine and admitted to operate the brakes, substantially as described.

4. The combination with an elevator or hoisting apparatus, of a winding drum, a threaded cylinder having a shaft connected to rotate with the winding drum, a brake for the drum, a traveler arranged to run in the thread of the cylinder, and devices connected with the traveler for automatically stopping the rotation of the drum when the traveler reaches either end of the threaded cylinder, substantially as described.

5. In an elevator controller the combination of the threaded cylinder 15 having its thread running spirally inward at each end, with a rotating disk arranged to run in the thread of the cylinder, and connections between the disk and the elevator stopping devices, substantially as described.

6. In an elevator controller the shaft, the threaded cylinder mounted on the shaft and having removable threaded sections, the thread on the end section running spirally inward to the shaft, in combination with a traveler arranged to run in the thread of the cylinder, and connections between the traveler and the elevator stopping devices, substantially as described.

In testimony whereof I affix my signature in presence of two witnesses.

CLARENCE BRALEY JOHNSON.

Witnesses:
  W. L. RAEDER,
  HENRY BRUNNER.